United States Patent [19]

Cashell et al.

[11] Patent Number: 4,850,779
[45] Date of Patent: Jul. 25, 1989

[54] MANIPULATOR FOR HANDLING OBJECTS WITHIN A SEALED CHAMBER

[75] Inventors: Edmund M. Cashell, Cork; Liam McDonnell, Ovens, both of Ireland

[73] Assignee: Tekscan Limited, Dublin, Ireland

[21] Appl. No.: 828,859

[22] Filed: Feb. 12, 1986

[30] Foreign Application Priority Data

Feb. 15, 1985 [IE] Ireland ................................. 372/85

[51] Int. Cl.$^4$ ............................................. B25J 1/08
[52] U.S. Cl. ............................................. 414/3; 414/8
[58] Field of Search ................. 414/8, 7, 3, 753, 1, 414/751, 744.2, 744.6, 744.7, 744.8; 901/18, 36, 39; 294/115, 116; 277/30; 165/11 A

[56] References Cited

U.S. PATENT DOCUMENTS

| | | |
|---|---|---|
| 2,996,330 | 8/1961 | Hutto ................................. 414/8 |
| 3,426,920 | 2/1969 | Chesley ............................. 414/8 |
| 3,456,812 | 7/1969 | Gandolfo et al. ................. 414/8 |
| 3,625,378 | 12/1971 | Attiz ................................. 414/8 |
| 3,630,391 | 12/1971 | Wilson ......................... 414/753 X |
| 3,773,189 | 11/1973 | Kitamura et al. ............. 414/753 |
| 3,971,564 | 7/1976 | Bowen et al. ................. 277/30 |
| 4,030,615 | 6/1977 | Guggi et al. ................. 414/8 |
| 4,381,169 | 4/1983 | Muhr et al. ............. 294/116 X |
| 4,474,518 | 10/1984 | Critchley et al. ............. 414/8 |
| 4,561,825 | 12/1985 | Sakata ......................... 414/753 |

FOREIGN PATENT DOCUMENTS

| | | |
|---|---|---|
| 2751492 | 5/1979 | Fed. Rep. of Germany ...... 294/116 |
| 3003748 | 8/1980 | Fed. Rep. of Germany ...... 414/8 |
| 562669 | 6/1975 | Switzerland . |
| 444635 | 10/1974 | U.S.S.R. ........................ 414/8 |
| 814723 | 3/1981 | U.S.S.R. ...................... 294/116 |
| 2063122 | 6/1981 | United Kingdom ............ 414/753 |
| 2136765 | 9/1984 | United Kingdom ............ 414/3 |

*Primary Examiner*—Robert J. Spar
*Assistant Examiner*—William M. Hienz
*Attorney, Agent, or Firm*—Wolf, Greenfield & Sacks

[57] ABSTRACT

A manipulator for handling objects within a sealed environment, such as an ultra-high vacuum chamber, is mounted on a port of the chamber so that an active portion of the manipulator terminating in a set of gripping jaws is located within the chamber, while an operating portion of the manipulator is located externally of the chamber. The gripping jaws are mounted at one extremity of a shaft for rotation through at least 360° irrespective of whether they are in an open or closed configuration. The jaws are opened and closed from the exterior of the chamber by means of a sleeve which is axially slidable on the shaft by means of a drive ring located on the operating portion of the manipulator. The interior of the manipulator is sealed against the environment external of both the manipulator and the chamber on which it is mounted by a continuous sealing boundary, which has no sliding seals and is made up of a series of rigid sections interconnected by metal bellows units, these latter permitting the rotation and axial shaft and sleeve displacements required for jaw rotation and for opening and closing movements of the jaws. Further metal bellows units in this continuous boundary permit axial displacement of the jaw region of the manipulator, irrespective of its rotational disposition and gripping configuration, and lateral movement of the jaw region in any direction, so that the jaws may be located at any point within a three-dimensional volume determined by the dimensions of the manipulator and the maximum displacements of the bellows units.

6 Claims, 5 Drawing Sheets

MANIPULATOR FOR HANDLING OBJECTS WITHIN A SEALED CHAMBER

BACKGROUND OF THE INVENTION

1. Field of the invention

This invention relates to manipulator means for handling objects in a sealed environment and in particular to manipulator means of this kind for use in the testing of samples under ultra-high vacuum conditions.

2. Description of the prior art

Known manipulator means for use in these circumstances consist of so-called "wobble sticks", in the simplest constructions of which a spring clip mounted on the end of an arm can be swung to various positions within a sealed chamber by virtue of the arm being mounted in a port in the wall of the chamber in a flexible bellows structure. The bellows seals the chamber from the external environment and the wobble stick can be wobbled or tilted by flexing of the bellows. In a somewhat more elaborate construction, a limited degree of axial displacement of the wobble stick may also be provided and a gripping jaw, rather than a simple resilient clip, may be incorporated, the grasping and releasing operations of the jaws being controllable from outside the chamber.

BRIEF SUMMARY OF THE INVENTION

It is an object of the present invention to provide manipulator means for use in handling objects within sealed environments which will afford an improved number of degrees of freedom for movement of an object gripped by the means within said sealed environment.

According to the invention, there is provided a manipulator for handling objects within a sealed chamber, comprising:

(a) a first or active manipulator portion locatable within a said sealed chamber, (b) a second or mounting manipulator portion mountable on a wall portion defining a boundary region of a said sealed chamber so that said active manipulator portion is located inwardly of said boundary region and within said chamber, and (c) a third or operating manipulator portion located externally of said boundary region when the manipulator is mounted on a said wall portion, said active manipulator portion having object-holding means disposable in a plurality of operating configurations, said operating manipulator portion having control means for displacing said object-holding means between one of said operating configurations and another of said configurations and having an internal region which is in communication with the environment within a sealed chamber when the manipulator is mounted on a said wall portion, said object-holding means of said active manipulator portion being continuously rotatable through at least 360° about an axis of the manipulator extending between said object-holding means and said control means of the operating manipulator portion, and said internal region of said operating manipulator portion being sealed against the environment external of a said sealed chamber and the manipulator.

Said object-holding means may be a grasping means having a gripping configuration and a release configuration. In a preferred construction, said grasping means has a pair of opposed jaws, each of said jaws being pivotably mounted and having an object-engaging face which is urged towards the corresponding face of the opposed jaw in said gripping configuration of the grasping means. Spring means may be provided for urging said jaws towards said release configuration of the grasping means.

According to a preferred feature of the invention, said internal region of said operating manipulator portion is sealed against said external environment by a substantially continuous sealing boundary, no region of which is slidingly displaceable relative to any adjacent region thereof. Said sealing boundary may be defined by a plurality of boundary portions which are substantially fixedly connected together in an assembled configuration of the manipulator to provide said substantial continuity of said sealing boundary. At least one region of said sealing boundary is suitably defined by a metal bellows portion of generally circular cylindrical configuration in an undeformed disposition of the bellows portion, axial end regions of said bellows portion being substantially fixedly sealingly connected with adjacent regions of said sealing boundary.

In addition to the feature of full rotatability of the object-holding means, which is provided according to the invention, it is preferred that this means should also be directly displaceable from substantially any location within a predetermined three-dimensional region of a said sealed environment to substantially any other location within said region.

Accordingly, a said metal bellows portion may be interposed between said mounting portion of the manipulator and a region of the manipulator located outwardly of said mounting portion relative to a said sealed chamber when the manipulator is mounted thereon, to permit displacement of said outwardly located region of the manipulator relative to said mounting portion in the direction of said axis of the manipulator extending between said object-holding means and said control means to thereby displace an object held by said object-holding means in said axial direction.

According to a further feature of a preferred embodiment of the invention, said mounting portion may include a flange portion sealingly associatable with a port region of a said chamber and a said metal bellows portion may be interposed between said flange portion and a region of the manipulator located outwardly of said flange portion relative to a said sealed chamber when the manipulator is mounted thereon, to permit displacement of said outwardly located region of the manipulator relative to said flange portion in directions at least in part substantially perpendicular to the direction of said axis of the manipulator extending between said object-holding means and said control means, so that the manipulator may be tilted when in a mounted disposition on a said chamber to thereby displace an object held by said object-holding means in a sidewise direction.

This tilting motion when combined with the facility for axial displacement allows an object held by the jaws to be moved from substantially any location within a three-dimensional region limited ultimately by the maximum axial and lateral displacements of the manipulator means to substantially any other point within said region.

Said metal bellows portion interposed between said flange portion and said outwardly located manipulator region may be sheathed by a generally part-spherical housing, a first section of which is slidingly displaceable relative to a second section thereof, so that during said relative sliding displacement, said first section occupies successive dispositions on the surface of a notional sphere. This arrangement permits precision tilting and guidance of the manipulator means of the invention during tilting of the manipulator for sidewise displacement of the grasping jaws.

In an especially favoured embodiment of manipulator according to the invention, said object-holding means is mounted at one axial end region of a shaft extending within said manipulator in the direction of said axis of the manipulator which extends between said object-holding means and said control means, said shaft being mounted for rotation about said axis, and said control means of the manipulator includes drive means for rotating said shaft about said axis. Said shaft drive means may be drivingly associated through a region of said sealing boundary with a region at the other axial end of said shaft from said object-holding means, for orbital rotation about said axis of a portion of said shaft end region, and said axial end region of the shaft may be enclosed within a said metal bellows portion extending axially from said region of said sealing boundary through which said driving association takes place. Alternatively said shaft drive means may be drivingly associated through a region of said sealing boundary with a region at the other axial end of said shaft from said object-holding means, for rotation of a portion of said shaft end region about said axis by magnetic coupling means, a first portion of said magnetic coupling means being located externally of said sealing boundary region and being driveable by said shaft drive means and a further portion of said magnetic coupling means being located internally of said sealing boundary region and being driveable Dy displacement of said external portion of said coupling means to rotate said shaft.

A sleeve may extend substantially coaxially of said shaft within said manipulator in the direction of said axis of the manipulator extending between said object-holding means and said control means, said sleeve being axially displaceable relative to said shaft and associated with said object-holding means for displacement of said means between operating configurations thereof, and said control means may include means for axially displacing said sleeve relative to said shaft. In a particular construction, said sleeve is associated with said jaws of the grasping means by activating means mounted on said shaft for rotation therewith, said activating means being displaceable relative to said shaft in the direction of said axis of the manipulator to displace said jaws between said gripping and release configurations of the grasping means. In a preferred arrangement, said sleeve is non-rotatably mounted within said manipulator and said activating means is associated with said sleeve through bearing means for transmitting axial displacement of said sleeve to said activating means while also permitting rotation of said shaft and activating means relative to said sleeve and about said axis of the manipulator.

In a favoured construction of manipulator according to the invention, said sleeve may be associated with a radially inward region of said flange portion by a gimbal mounting so that said axially outward region of the manipulator may be tilted in substantially anY direction about a notional pivot point defined by the intersection of the mutually perpendicular axes of pivoting of said gimbal mounting, said sleeve being axially displaceable within said gimbal mounting. In addition to being established in first instance by the maximum axial and slewing displacements of the manipulator itself, however, the three-dimensional volume accessible to the grasping jaws or other object-holding means of the manipulator may in a particular installation also be limited by the dimensions of the port in the wall of the sealed environment through which the manipulator extends. A larger flange and larger gimbal mountings will permit a larger region or volume to be accessed. However even with a large flange, the region which can be accessed may be constrained by the axial length of the port, the degree to which the manipulator may be tilted being possibly limited by its coming into contact with the edge of the mouth of the port opening into the interior of the sealed environment rather than by the maximum lateral motion allowed by the gimbal mounting.

Said sleeve-displacing means of the control means may include a drive member substantially fixedly associated with the axial end region of said sleeve remote from said activating means, said driving member defining a region of said sealing boundary, and said axial end region of the sleeve being enclosed by at least one said metal bellows portion located between said drive member and a further adjacent region of said sealing boundary.

In a favoured construction, a said metal bellows portion is located to each axial side of said drive member of the sleeve-displacing means. A floating bellows arrangement is thus provided, by virtue of which said sleeve-displacing drive member and its associated sleeve and activating mechanism may be displaced axially without axial displacement of any other parts of the manipulator. Accordingly the jaws may be opened and closed without altering the location in space of the active end of the mechanism and in particular, the spatial location of the jaws.

BRIEF DESCRIPTION OF THE DRAWINGS

An embodiment of a particular construction of manipulator according to the invention will now be described having regard to the accompanying drawings, in which.

DETAILED DESCRIPTION OF THE INVENTION

Figure 1:
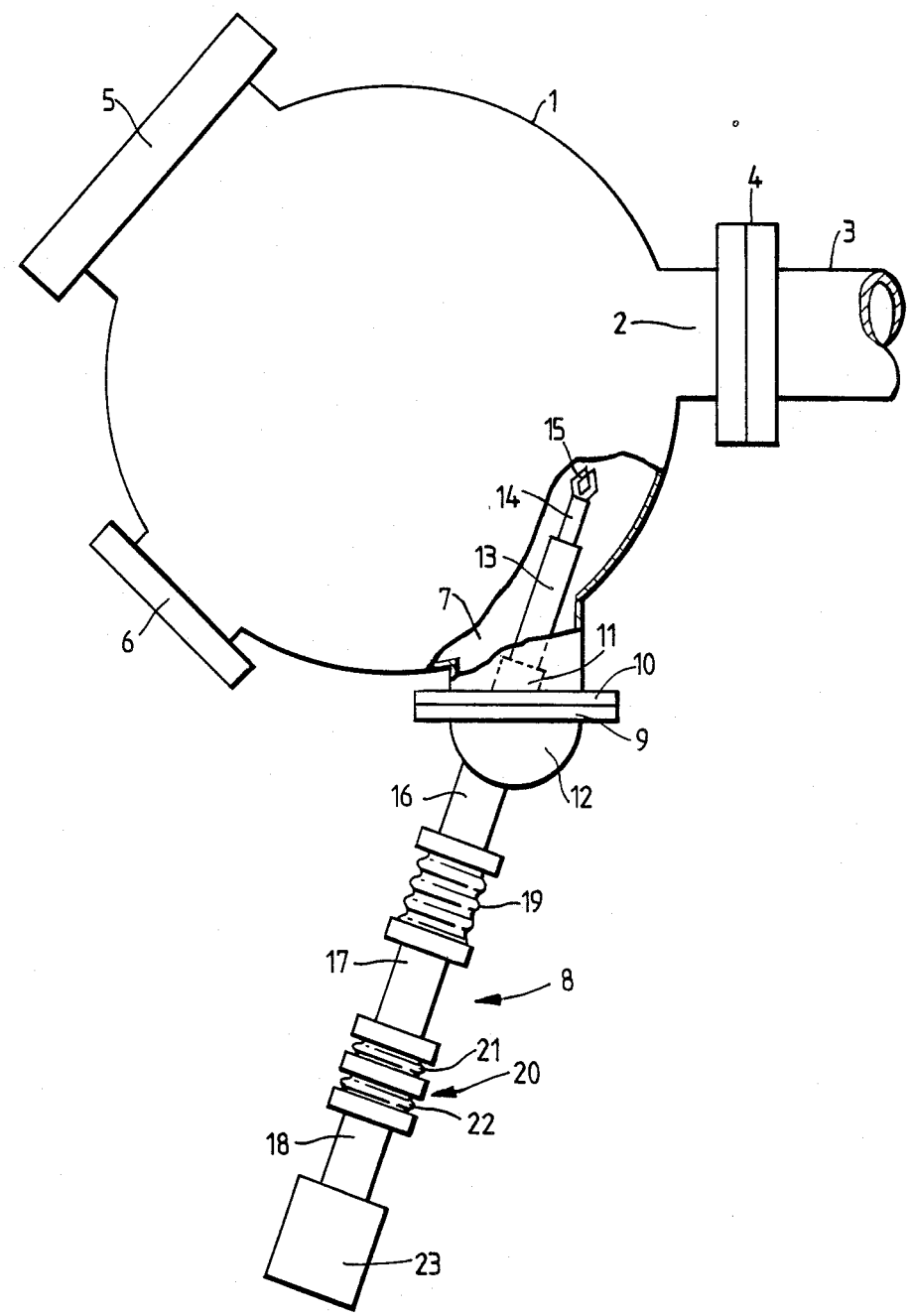
FIG. 1 shows a top view of an ultra-high vacuum chamber provided with a manipulator according to the invention.

As shown in FIG. 1, an ultra-high vacuum chamber operating with a vacuum condition as low as $10^{-11}$ mm Hg is indicated by reference 1. The chamber has an entry port 2 communicating with an entry duct 3 through which specimens for, for example, testing of surface features, may be introduced. The entry duct 3 is coupled to the chamber 1 by means of a flanged connection 4. Further ports 5 and 6, in each case equipped with a coupling flange, may serve for observation purposes, for example, by incorporating a suitable window, or for the attachment of apparatus for measuring purposes, such as for example, an electron microscope. Yet another port 7 accommodates a manipulator 8 according to the present invention.

As shown schematically in the present Figure, manipulator 8 has a flange 9 by which it is coupled to flange 10 of port 7. The manipulator has a swivel sleeve 11 which is located internally of the chamber 1 and is mounted within flange 9 by a gimbal bearing arrangement, this allowing it to be swivelled universally in the manner of a compass mounting. In the interior of the chamber, an inner sleev extends inwardly from the swivel sleeve 11, and the manipulator terminates in a jaw supporting portion 14, on which gripping jaws 15 are displaceably mounted, these features of the manipulator together defining an active portion thereof.

Externally of the sealed environment defined within the chamber 1, the manipulator 8 has housing portions 16, 17 and 18, these together defining an operating manipulator portion. In order to sealingly couple the housing sections located externally of chamber 1 to the flange 9 while still permitting tilting or swivelling movement of the manipulator, a bellows (not visible in the present schematic drawing) is mounted between housing portion 16 and flange 9. This bellows is sheathed within a two-part shroud 12 of part-spherical configuration, which both protects the bellows and also provides precision guidance of the tilting displacement. Housing portions 16 and 17 are separated by a bellows 19, by means of which axial displacement of the manipulator jaws may be brought about. This axial displacement is achieved by moving all parts of the manipulator outwardly of bellows 19 in an axial direction, i.e. housing portions 17 and 18 and other components to be mentioned which are fixedly associated with them, and results in axial movement within the chamber of sleeve 13, jaw supporting portion 14 and jaws 15. Housing portion 16 and swivel sleeve 11 do not undergo axial displacement, and the bellows previously mentioned, which is not shown in this drawing, but is located within shroud 12, connects housing portion 16 and manipulator flange 9, so that the interior of the manipulator means remains sealed against the external environment irrespective of its degree of tilt or skew.

A jaw activation mechanism for engaging and releasing the jaws is indicated by reference 20 and is located between housing portions 17 and 18. This mechanism incorporates bellows 21 and 22, and opening and closing of the jaws is achieved by axial displacement of a central ring located between these bellows. However, the axial spacing between housing portions 17 and 18 remains unchanged during activation of the jaws, by virtue of an arrangement to be described, and expansion of bellows 21, for example, is accompanied by compression of bellows 22.

At its axially outermost end, the manipulator terminates in a metal bellows sealed rotary drive unit 23, by means of which the jaws may be rotated through and beyond 360°. Unit 23 may incorporate an orbiting pivot point located in one axial end of a sealed bellows unit, or alternatively rotary motion of the jaws may be achieved by means of a magnetic coupling arrangement.

Figure 2:
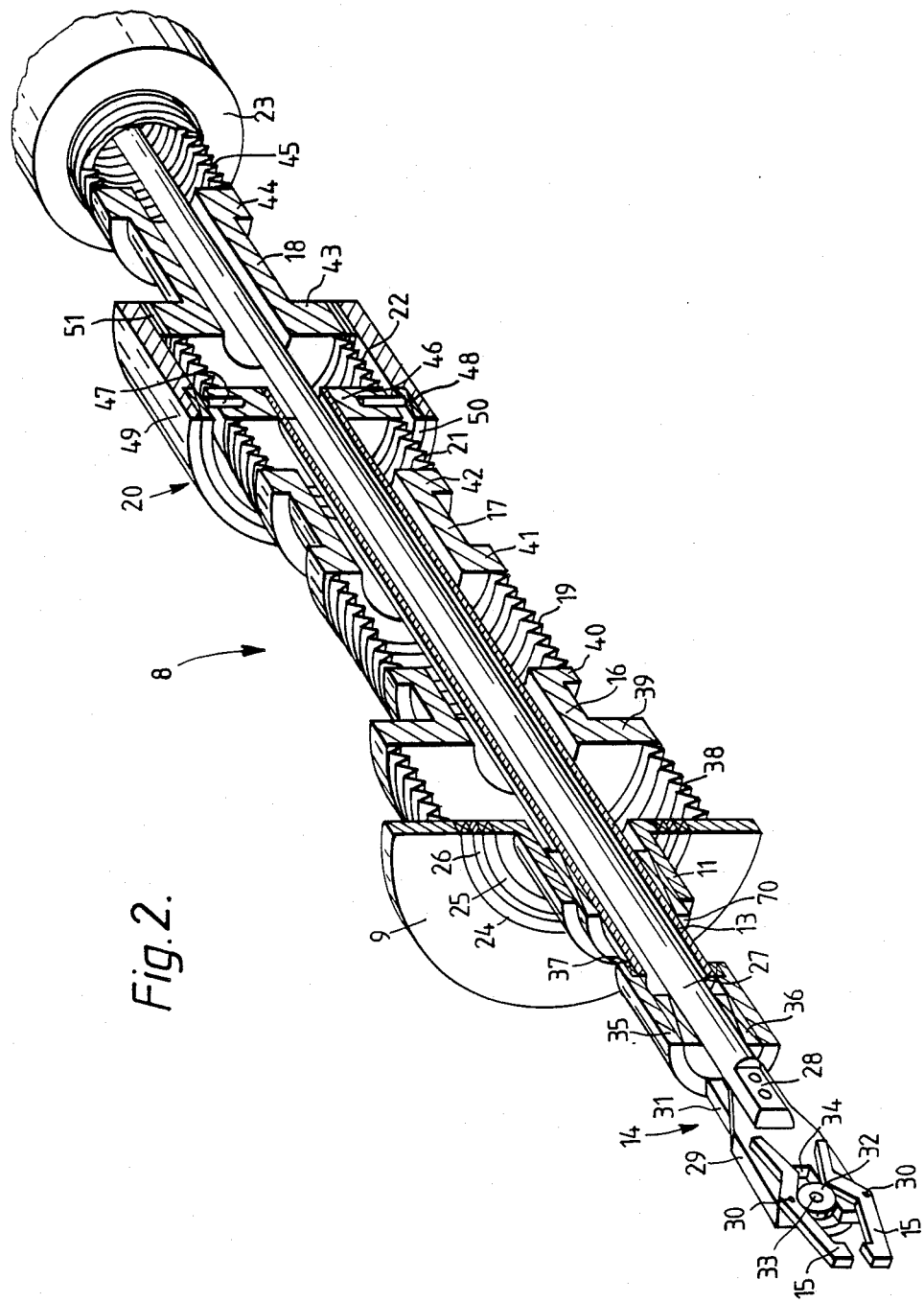
FIG. 2 is a pictorial view of a manipulator according to the invention, simplified in certain non-essential aspects for ease of illustration and explanation, and sectioned along an axial plane.

The manipulator means of the invention will now be described in more detail, initially in regard to the pictorial view of FIG. 2, and subsequently also in regard to the various sectional views of FIGS. 3 to 6. As shown in FIG. 2., flange 9, by means of which the manipulator 8 is mounted in the port 7 of chamber 1 of FIG. 1, has outer 24 and inner 25 gimbal bearings, separated by an intermediate ring 26. The gimbal bearing structure is conventional in that a pair of inner bearing members are disposed at right angles to a corresponding pair of outer bearing members so that the entire assembly may be swivelled any direction. However, because the bearing structure is exposed to ultra-high vacuum conditions, these bearings preferably incorporate sapphires, as do all of the other bearing elements of the manipulator of the invention which are exposed to or in communication with the vacuum conditions in the interior of chamber 1. Flange 9 is coupled to flange 10 (FIG. 1) of chamber 1 in conventional manner, and an intermediate gasket appropriate to the vacuum conditions prevailing is located between the coupled-together flanges.

The innermost part of the gimbal bearing assembly is defined by sleeve 11. Inner sleeve 13 is located radially inwardly again of sleeve 11 and, as will be described, is axially displaceable relative to it. Rotatingly housed within sleeve 13 is axial shaft 27, which extends between the jaw region of the manipulator and the rotary drive unit 23. Shaft 27 is of circular cross section, but terminates at its leading end in a portion having two opposed milled-out flat side regions 28, against which jaw mounting elements 29 are affixed to define a jaw mounting fork. In FIG. 2, the front such jaw mounting element is omitted for clarity of explanation and representation. The jaws 15 are mounted between these forks by means of sapphire ball bearings 30 accommodated between bearing-receiving recesses in the side walls of jaws 15 and the inner side walls of the fork elements 29 respectively. Each pair of bearings 30 associated with a jaw member 15 defines an axis extending transversely between the members 29. Accordingly the jaws 15 pivot inwardly and outwardly towards and away from the axis of shaft 27 within the space defined between the two members 29 defining the jaw mounting fork.

The jaws 15 are urged towards an open condition by means of springs, not indicated in this Figure. In order to close the jaws, so that they may grip an object placed between them, a further fork mechanism is provided, consisting of outer fork members 31 which embrace and enclose and are axially displaceable relative to, the inner or jaw mounting fork defined by members 29. Each member 31 is parallel to and adjacent to a respective member 29, but for clarity, only the member 31 to the rear of the jaw structure is shown in FIG. 2. A sapphire roller bearing member 32 is mounted on a pin 33 extending between the outer fork members 31 and parallel to the axes of pivoting of the jaws, as defined by the bearings 30. Relative axial sliding displacement of the inner and outer forks results in the roller 32 being moved forwardly or rearwardly in a direction at right angles to its axis and parallel to the axis of shaft 27, and during such motion in a rearward direction, i.e. axially towards rotary drive unit 23, roller 32 engages against surfaces of the jaws 15 to the rear of their axes of pivoting as defined by the bearings 30, so that these rearward portions of the jaws are forced outwardly, and accordingly the gripping front ends of the jaws are forced together. In order to allow roller 32 and its mounting pin 33 to be displaced axially in this way, the inner jaw mounting forks 29 are each provided with an axially extending slot 34.

The outer fork members 31 extend forwardly from an axial outer fork support sleeve 35, which is axially displaceable relative to shaft 27 by means of an axial or linear bearing 36, again incorporating sapphire rolling elements, and the sleeve 35 is rotatably displaceable relative to sleeve 13 by means of a further bearing 37. Sleeves 35 and 13 are however coupled together by bearing 37 for axial displacement. Outer fork members 31 and outer sleeve 35 are machined from a single piece of metal to form an integral unit for axial and rotational displacement. Alternatively they may be manufactured individually and solidly connected, such as by welding, at their mutual interfaces.

Accordingly the entire jaw assembly at the leading end of the manipulator may be rotated freely through and beyond 360°. The shaft 27, the inner fork 29 and the jaws 15 mounted thereon, all rotate as a unit, when shaft 27 is rotated by drive 23. The outer fork support sleeve 35 and the outer fork 31 itself, together with the roller 33 mounted within the outer fork, also are carried around with the inner fork assembly during such rotation and are freely rotatable relative to sleeve 13 by virtue of bearing 37. However axial displacement of sleeve 13 results in corresponding axial displacement of sleeve 35 and the outer fork so that opening and closing of the jaws is achieved. During such axial displacement, sleeve 35 slides relative to shaft 27 by virtue of bearing 36, but there is no axial displacement of the shaft so that the spatial location of the jaws remains unchanged during an opening or closing movement of them.

In use of the apparatus, the components of the manipulator according to the invention described so far are all located within an ultra-high vacuum chamber. Accordingly they are fully exposed to the vacuum conditions. The portions of the manipulator now to be described are located externally of the chamber and are concerned with the arrangements by which the various movements available to the jaw head portion of the device are initated and controlled.

Moving outwardly from flange 9, a bellows 38 bridges the space between this flange and a leading end flange 39 of housing portion 16. Bellows 38 allows the entire manipulator assembly portion located outwardly of the chamber 1 to be slewed or swivelled or tilted in any direction while also sealing the interior of the assembly against the outside environment. Thus bellows 38 effectively protects the gimbal assembly incorporated in flange 9 from the exterior environment.

From an outer or rear end flange 40 of housing portion 16, the axial displacement bellows 19 extends rearwardly and terminates at a leading end flange 41 of housing portion 17. Both bellows 38 and bellows 19 are in each case welded to the respective housing portion flanges at each end, so that there are no leakage paths available for the ingress of contaminating gases from the outside environment.

The jaw activation mechanism 20, subsequently described in more detail, is located between an outer end flange 42 of housing portion 17 and an inner or leading end flange 43 of the final housing portion 18. While mechanism 20 incorporates, as already mentioned, bellows 21 and 22, an additional feature of this mechanism ensures that the axial spacing of flanges 42 and 43 is at all times fixed, so that there is no alteration in the overall axial dimension of the mechanism 20 during use of this feature of the manipulator, and hence no spatial displacement of the jaws.

At the axially outer end of housing portion 18, an outer or rear end flange 44 is welded to a further bellows 45 which terminates in or at the rotarY drive unit 23. The drive unit 23 is of conventional construction and is not therefore described further herein.

The jaw activation mechanism 20 incorporates inter alia, a central activating ring 46 defining a drive member of the mechanism, which is attached to the axially outer end of the inner sleeve 13, for example, by screw threading. Ring 46 is moved in the axial direction of the mechanism to slide sleeve 13 axially inwardly or outwardly, so that the outer fork assembly including members 31 at the jaw end of the manipulator is moved relative to the inner or jaw supporting fork assembly defined by members 29 to open or close the jaws. When ring 46 is moved axially in one direction, bellows 21 is compressed and bellows 22 expands, because the flanges 42 and 43 of housing portions 17 and 18 respectively are held at a fixed spacing by another component of the mechanism, not illustrated in the present drawing, which is intended to depict this portion of the construction schematically and with a view to clarifying its functioning, rather than in total technical detail in all aspects.

The mechanism by which the central ring 46 is displaced axially is however indicated schematically in the present Figure, in the form of radial pins 47, which engage in radial bores in ring 46, these extending inwardly into the ring from its outer circumference or periphery. These pins 47 are affixed to and extend inwardly from the inner race of a bearing 48, which is housed within an outer sleeve 49 and retained within this sleeve by a locking ring 50. The outer sleeve 49 is displaced axially relative to the housing portion 18 by means of an interconnection including a screw thread 51. Accordingly rotation of outer sleeve 49 causes this sleeve to advance or withdraw relative to housing portion 18 along the screw thread 51, and the inner ring 46 is thereby carried axially forwardly or rearwardly along with the outer sleeve. It will be apparent that rotation of the outer sleeve 49 does not result in rotation of the central ring 46, in that bearing 48 ensures that only the axial movement of the outer sleeve is transmitted to pins 47, and hence to ring 46, without any of the rotating motion of the sleeve 49 being transferred. In the pictorial view of FIG. 2, the screw thread interconnection of outer sleeve 49 relative to housing portion 18 is indicated by a direct inter-threading 51 between sleeve 49 and flange 43. In the practical construction subsequently described, an intermediate member is interposed in this region, but the kinematic relationship remains unaltered. Even a relatively coarse thread 51 will normally provide adequate axial locking of sleeve 49, but if required, additional locking means for the member may be incorporated in the unit of the invention.

Before describing the further technical features of the practical construction of the invention illustrated in FIGS. 3 to 6, a number of its principal features may be adverted to in the light of FIG. 2. Important features of the invention are the ability to rotate a specimen which is positively gripped in the jaws 15 continuously through 360° and beyond, without angular limitation, combined with the facility for locating the specimen at substantially any point within a three-dimensional region determined by the limits of tilting of the gimbal bearings and bellows 38 and the limits of axial travel determined by the maximum extension of bellows 19, at least so far as constraints on displacement imposed by the manipulator itself are concerned. As previously noted however, the three-dimensional volume which may be accessed by the manipulator in any given installation may also be in part determined or limited by the physical dimensions of the port in which the manipulator is mounted. A specimen may also be picked up or released or re-oriented at any position within this three-dimensional region, in complete independence of the disposition of the manipulator. This total freedom of movement is achieved in a construction without sliding seals. All seals between the external environment and the interior of the manipulator are either metal to metal or are achieved by means of bellows, thereby. providing a continuous sealing boundary against the external environment. Accordingly leakage paths to the interior of the manipulator and hence to the interior of a vacuum region within which the manipulator is operating are substantially eliminated. It will be apparent from FIG. 2 in particular, that the interior of that part the manipulator means located externally of the sealed environment is in fact in communication with the interior of the chamber defining that environment and is thus exposed to the conditions prevailing within the chamber. Accordingly in the case of an ultra-high vacuum chamber, this region of the interior of the manipulator must also be pumped down to the prevailing vacuum conditions. In order to facilitate the rapid exhaust of gaseous material from the interior of the manipulator, axial passages in the form of slots, e.g. milled-out keyways, may be provided as appropriate along portions of the length of the shaft 27, while ring 46 in the jaw activation assembly may have axial bores to allow ready evacuation of the axially outer end region of the interior of the assembly. The arrangement of the rotary drive unit 23 as depicted in FIG. 2 includes a bellows 45, which would be a requirement if an orbital drive were in question, but in the case of a magnetic coupling arrangement the termination of the manipulator in this region may be otherwise than as shown. As in the case of all such bellows employed in the apparatus of the invention, bellows 45 is of generally cylindrical configuration in an undeformed disposition.

Figure 3:
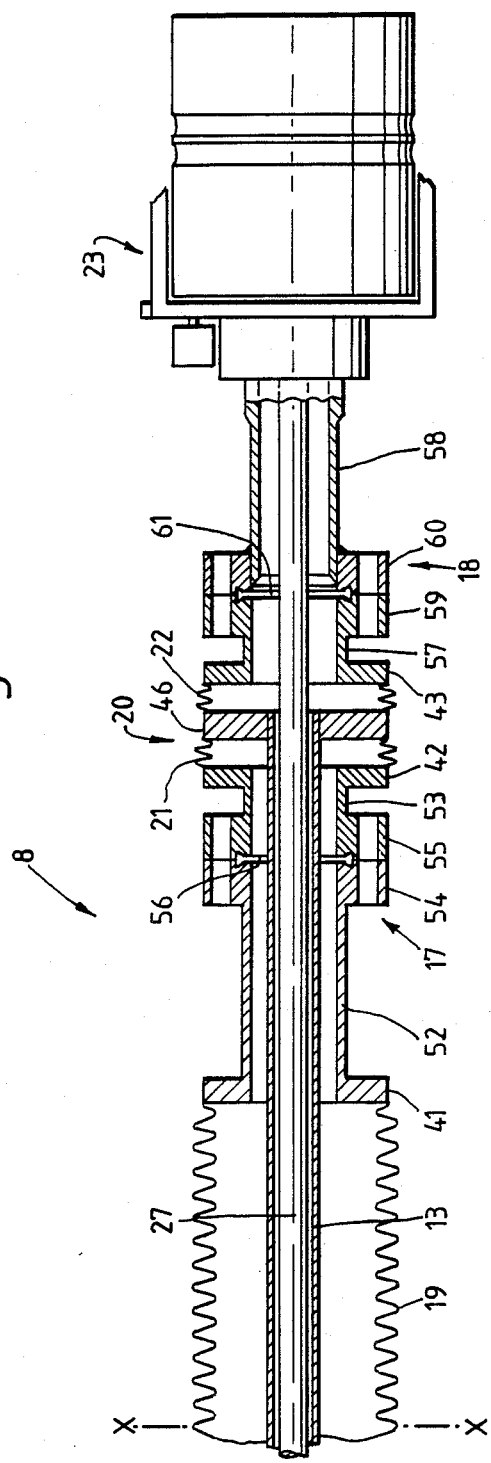
FIG. 3 shows the right hand end of the manipulator of FIG. 2, in front view and sectioned along a vertical axial plane.

FIG. 3 is a front view in axial section of the right hand end of an embodiment of the manipulator according to the invention. The arrangement shown is in general accord with the pictorial and illustrative representation of FIG. 2 but also highlights some specific features of the mechanical construction of the device. Drive unit 23 is again generally conventional in construction and is thus represented in outline only. It will be seen that in this practical configuration, the housing portion 17 consists in fact of an leading housing portion 52 and a rear housing portion 53, interconnected by flanges 54 and 55 located intermediate the inner end flange 41 and the outer end flange 42 of housing portion 17, considered as a unit. The flanges 54 and 55 are bolted together and sealing of this assembly is ensured by an intervening copper gasket 56. From the point of view of the functioning of the unit, housing portion 17 represents a single integral entity and its formation as a two-part component is solely for practical reasons of ease of assembly of the manipulator. Housing portion 17 may also consist of a unitary or integral structure in an alternative arrangement.

The housing portion 18 is put together in a similar manner. The housing portion has an inner or leading end section 57 and an outer or rear end section 58, again interconnected by bolts passing through abutting intermediate flanges 59 and 60. A copper gasket 61 is again interposed in suitably formed grooves in the inner abutting faces of these flanges. Flange 60 is, in the construction shown, welded to tubular outer end section 58, but it may also be otherwise formed as an integral unit with that tubular section.

The end of housing section 58 in the vicinity of the drive unit 23 is not sectioned in this view, and it may or may not include a bellows 45, as depicted in FIG. 2, depending on whether or not the rotary drive is by means of an orbiting termination of the shaft or by means of magnetic coupling. Irrespective of the type of drive unit used, the interior of the manipulator is solidly sealed against the external environment by a closed seal, incorporating a bellows if required. There are no sliding seals within the rotary drive unit 23, regardless of the method by which rotary drive is achieved.

For reasons of clarity all details of the jaw activation mechanism 20 are omitted from FIG. 3, and these are further explained in regard to a subsequent Figure.

Figure 4:
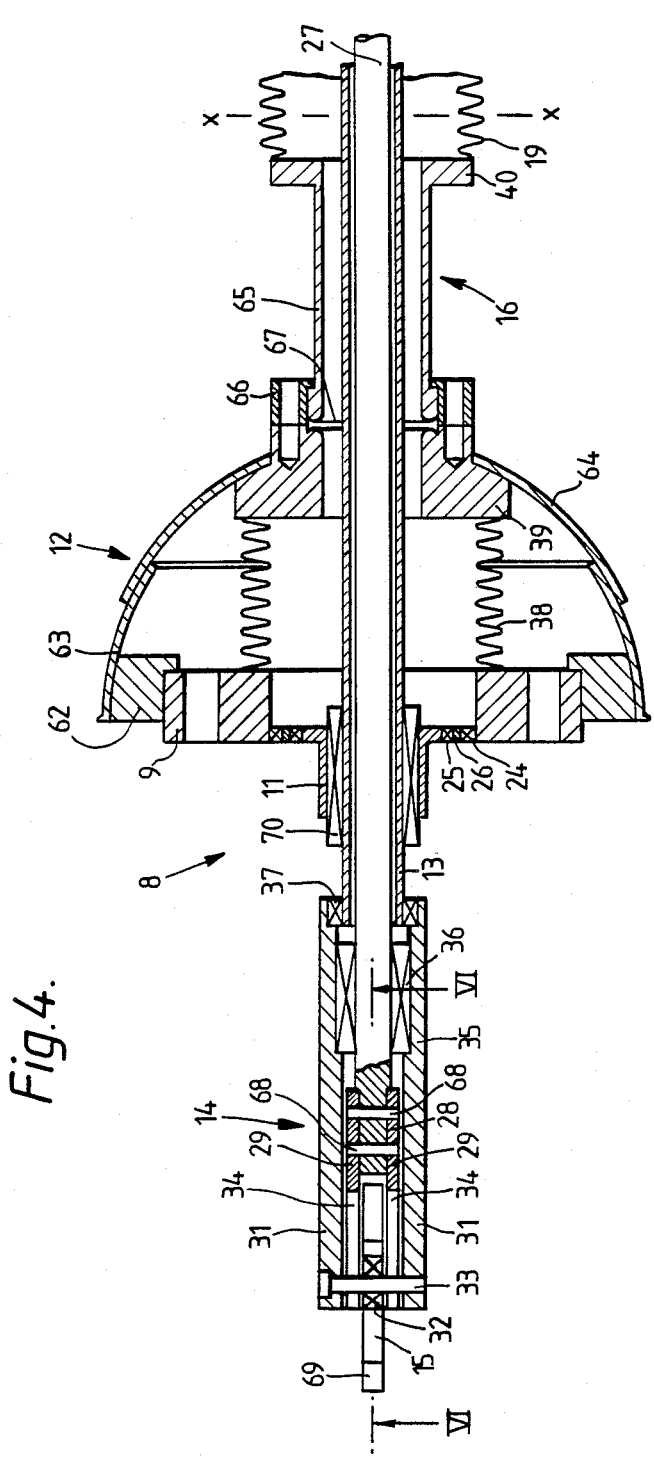
FIG. 4 shows the left hand end of the same unit in a similar sectional view, but sectioned on a plane at right angles to the section plane of FIG. 3.

FIG. 4 shows, in a practical construction, the left hand end of a manipulator according to the invention, again in general accord with the arrangement of FIG. 2. In this instance an axial section in top view is in question, so that the section is along a plane at right angles to the section plane of FIG. 2. In this way further details of the gripping jaw assembly become apparent. The majority of te features of this portion of the manipulator have already been discussed in regard to FIG. 2, and only those requiring further discussion or amplification having regard to FIG. 4 are now set out.

Flange 9 is bolted to flange 10 of chamber 1 (FIG. 1) by set screws or bolts passing through suitably located holes in the outer region of the flange. Outwardly of flange 9, an outer shroud ring 62 is fixed in position, which carries a first portion 63 of shroud 12. The second portion 64 of the shroud is mounted on flange 39 of housing portion 16. The two portions together define a substantially semi-spherical shroud and slide relative to one another during tilting of the manipulator.

As in the case of the other housing portions, portion 16 consists of two sections, a first section made up essentially of flange 39, and a second section 65 having an inner or leading end flange 66 and terminating at its outer end in flange 40, to which bellows 19 is welded. The continuation of the manipulator in FIG. 3 takes place from the line x—x indicated in FIG. 4 and vice versa. At its inner or leading end, flange 66 of section 65 is secured by screwed fasteners to the rear face of flange 39, a copper gasket 67 being interposed to seal these components together. Accordingly in the manner of the other housing portions, portion 16 forms a solid unit when assembled, its ability to be dismantled being provided for convenience in assembly and repair or maintenance of the manipulator.

Almost all of the components in the jaw region of the manipulator have previously been described in regard to FIG. 2. Additional items illustrated more clearly in the present drawing include pins 68 or other fasteners by means of which the jaw mounting fork members 34 are attached to the laterally recessed leading end of shaft 27, the actual sample or test specimen engaging face 69 of the lower jaw member 15 and the axial or sliding displacement bearing 70, (also apparent in FIG. 2), by means of which the tube or sleeve 13 and the components associated with it may be displaced axially relative to the gimbal mounted sleeve 11.

Figure 5:
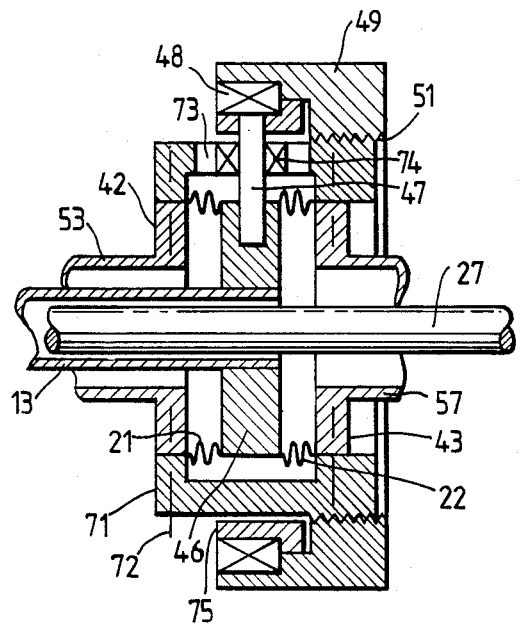
FIG. 5 shows further detail of the means for opening and closing the jaws of the manipulator.

FIG. 5 shows in axial section the jaw activation mechanism region of the manipulator of FIGS. 2 and 3 in a practical construction. The components already described in relation to the earlier Figure. are not again enlarged upon here. FIG. 5 shows in particular the further practical features by means of which the jaw activation mechanism 20 functions, as compared with the pictorial representation of FIG. 2, in which the principles on which this mechanism functions are emphasised in simplified form. In particular, an annular flange spacer 71 spans the axial gap between flanges 42 and 43 radially outwardly of and clear of the bellows 21 and 22. This spacer is screwed to the flanges by radially extending fasteners located along the axes indicated by reference 72. Axially elongate slots 73 extend along this generally cylindrical spacer parallel to the axis of shaft 27 so as to allow the radial pins 47 to move in the elongate direction of the manipulator, but not in a circumferential direction relative to its elongate axis. Bearings 74 surround the pins 47 within these slots, so as to minimise friction during translational movement of the pins. As already in part explained, the radially outer ends of pins 47 are secured such as by welding to the inner race of bearing 48, which is retained in position within the outer sleeve 49 by a retaining member (50 in FIG. 2) such as a circlip, not indicated specifically in FIG. 5 on account of its small dimensions. Radially inwardly of outer sleeve 49, a further annular inner ring 75 provides thrust support for the inner ring of bearing 48, during the axial displacement of sleeve 49 and the accompanying axial movement of ring 46 induced by translational displacement of pins 47. Pins 47 pass through radial holes provided in this inner annular ring 75 at appropriate locations.

The working of the mechanism will be again apparent from FIG. 5. The housing portions 17 and 18 are retained at a fixed spacing by virtue of the annular flange spacer 71. Outer sleeve 49 is screw-threadingly associated with this spacer by means of threading 51, so that rotation of sleeve 49 relative to the spacer 71 causes the sleeve 49 to be displaced axially. Such axial displacement carries pins 47 in the axial direction of the manipulator, thus moving the central ring 46 either forwardly or rearwardly to expand one of bellows 21 and 22 and compress the other. Central ring 46 is affixed to the outer axial end of sleeve 13, so that when the ring 46 is axially displaced, sleeve 13 also moves axially and achieves the desired closing or opening of the jaws.

Figure 6:
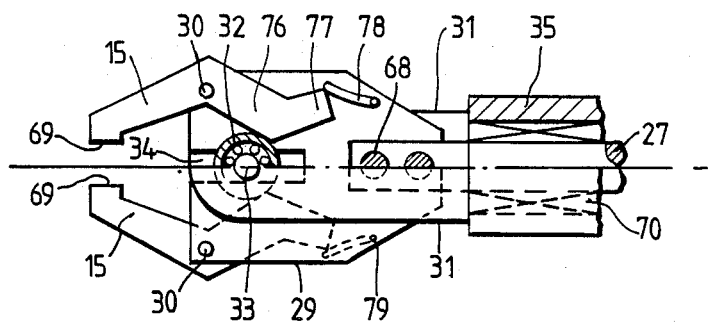
FIG. 6 is a detailed view of the jaw region of the manipulator, the portion of the rawing above the axial centre line being in section on the line VI—VI of FIG. 4.

FIG. 6 shows further detail of the jaw assembly end of the manipulator. The upper part of the drawing is in section, on the section plane of FIG. 2. The configuration of the jaws 15 is particularly apparent in FIG. 6. From the pivot axis defined by bearings 30, located substantially midway along the axial length of each jaw, the jaw extends inwardly towards the axis of the manipulator in the direction of its gripping or engaging face 69. On the other side of the pivot 30, it extends similarly radially inwardly, so that the two opposed jaws define between them in this rearward region of the jaw a gap which narrows rearwardly and within which the roller 32 is located. This inwardly extending rear end portion 76 terminates where the gap between the opposed jaws is at a minimum, and the jaw then continues further rearwardly with a cranked rear end portion 77, which extends radially outwardly again from the longitudinal axis of the manipulator. At the rearmost end of this cranked part 77, a leaf spring 78, mounted for pivoting about a pivot axis 79 defined between and extending transversely between the fork parts 29, acts against the rearmost part of the cranked section 77 so as to pivotingly urge the jaw 15 towards an open configuration. Closure of the jaws so that an object or test specimen may be gripped between faces 69 takes place by rearward translational displacement of roller 32. As roller 32 is moved rearwardly by virtue of sliding displacement of its pivot 33 along the axial slots 34 in forks 29, its outer periphery bears against the inwardly extending surfaces of portions 76 of jaws 15 to force these portions apart, thereby urging the rear parts of the jaws in an outward direction and forcing the engaging faces 69 of the jaws towards one another to grip any object located between them. The action of the springs 78 is such that the jaws are normally urged towards an open condition and positive action by the activation mechanism 20 is required to move the jaws into their closed configuration and to retain them in that configuration.

The manipulating mechanism of the invention may be used to handle specimens, tools, assemblies and other items within vacuum vessels, containment vessels and other closed or sealed environments within chambers, where several degrees of freedom of mechanical movement are required while the hermetic integrity of the vessel or chamber must also be maintained. Accordingly the manipulator of the invention lends itself to a multiplicity of uses. In a typical application, it may be used to pick up a specimen entering chamber 1 of FIG. 1 through entry port 2 and transfer it to an inspection location, where the specimen may be subjected to some form of analysis such as microscopy. The specimen may be held by the manipulator and adjusted in disposition and attitude during the measurement operations, or alternatively the manipulator may be used to locate and deposit the specimen at some required fixed point.

The use of stainless steel bellows to provide all sealing against the exterior environment where manipulator motions are in question allows hermetically sealed mechanical movement to be achieved in reliable manner. Sliding seals are entirely avoided. An all welded construction may be employed, although the modular assembly shown in the figures is favoured, in that it eases assembly and maintenance of the structure. The manipulator is particularly intended for and is especially suited to ultra-high vacuum techniques. Accordingly it may also be used in high vacuum ($10^{-7}$ mm Hg) environments and other less-rigorous regimes. Additionally it may find application for manipulating tools or specimens within a pressure environment. In summary, the suitability of the manipulator of the invention for ultra-high vacuum work facilitates its ready adaptation to less demanding situations.

The gripper assembly is opened and closed by means of the floating flange 46 between bellows 21 and 22. Sleeve or tube 13 is mounted on the central shaft 27 by means of the axial and rotary bearing combination 36 and 37 at the jaw end of the manipulator. A further bearing arrangement may be provided at the activation mechanism end of tube 13, in order to provide additional support and guidance of this relatively lengthy member relative to shaft 27. As already mentioned, for ultra-high vacuum applications, gas relief slots may be provided along the rotary shaft 27 and additionally in gimbal sleeve 11 to facilitate exhaustion of the interior of that portion of the manipulator which is located outside the controlled environment chamber.

The movements of the manipulator may also be motorised. Full motorisation may be achieved by means of five stepper motors, one of which controls jaw opening and closing, another rotary motion of the jaw assembly, a third axial motion of the jaw end region, while the final two control the tilting or swivelling of the assembly by means of gear drives acting on the inner and outer gimbal bearings. In both motorised and manually controlled versions, the tilt of the manipulator may be locked in any given disposition relative to flange 9, for example by a mechanism associated with the inner and outer shroud parts. In an alternative arrangement, a three-section shroud 12 may be provided.

Under ultra-high vacuum conditions, it is important that materials in contact with one another should not be prone to weld together or be subject to any like adhering process. Accordingly rolling contact bearings are favoured at all bearing locations in the manipulator assembly, and sapphires are preferably employed in these bearings, interposed between stainless steel inner and outer members of the bearings. Sapphires may be substituted in conventional bearings in lieu of steel rolling elements, or special bearings may be provided specifically for the manipulator.

The invention has for the most part been described in regard to a particular construction in which the active portion of the manipulator is provided with grasping means in the form of opposed jaws displaceable between a gripping or object-engaging disposition and a free or release configuration. The manipulator of the invention is not however limited to such constructions and alternative object-holding arrangements may be provided at the active end of the unit as required. Where grippers are provided, the jaws thereof may be arranged to be demountable for replacement or exchange within the sealed chamber, while services may also be provided at the object-holding end of the manipulator. Such services may include an electrical supply, feeds to a probe or probes, or connections for a small ion gun. A cold gripper may be provided with a liquid nitrogen feed to maintain a suitably low temperature at the gripper. Depending on the nature of the services provided, there may be a limitation on continuous rotation beyond 360°, due to the need to avoid winding up supply lines. However electrical services may be readily supplied through slip rings, and similar arrangements may be possible for certain other services, thereby preserving the facility for continuing rotation beyond 360°.

We claim:

1. A manipulator for handling objects within a sealed chamber, comprising:
   (a) a first or active manipulator portion locatable within a said sealed chamber,
   (b) a second or mounting manipulator portion mountable on a wall portion defining a boundary region of a said sealed chamber so that said active manipulator portion is located inwardly of said boundary region and within said chamber, and
   (c) a third or operating manipulator portion located externally of said boundary region when the manipulator is mounted on a said wall portion, said active manipulator portion having object-holding means disposable in a plurality of operating configurations, said operating manipulator portion having control means for displacing said object-holding means between one of said operating configurations and another of said configurations and having an internal region which is in communication with the environment within a sealed chamber when the manipulator is mounted on a said wall portion, said object-holding means of said active manipulator portion being continuously rotatable through at least 360° about an axis of the manipulator extending between said object-holding means and said control means of the operating manipulator portion and being mounted at one axial end region of a shaft extending within said manipulator in the direction of said axis fo the manipulator, said shaft being mounted for rotation about said axis, a sleeve extending substantially coaxially of said shaft within said manipulator in the direction of said axis of the manipulator, said sleeve being axially displaceable relative to said shaft by means of at least one bearing and being associated with said object-holding means for displacement of said means between operating configurations thereof, said at least one bearing being located in the vicinity of said one axial end region of said shaft, said control means of the manipulator including drive means for rotating said shaft about said axis and means for axially displacing said sleeve relative to said shaft, and said internal region of said operating manipulator portion being sealed against the environment external of a said sealed chamber and the manipulator, wherein said object-holding means has a pair of opposed jaws, each of said jaws being pivotably mounted and having an object-engaging face which is urged towards the corresponding face of the opposed jaw in a gripping configuration of the object-holding means; said sleeve is associated with said jaws of the object-holding means by activating means mounted on said shaft for rotation therewith, said activating means being displaceable relative to said shaft in the direction of said axis of the manipulator to displace said jaws between said gripping and a release configuration of the object-holding means; said sleeve is non-rotatably mounted within said manipulator; and said activating means is associated with said sleeve through bearing means for transmitting axial displacement of said sleeve to said activating means while also permitting rotation of said shaft and activating means relative to said sleeve and about said axis of the manipulator.

2. A manipulator according to claim 1, wherein said internal region of said operating manipulator portion is sealed against said external environment by a substantially continuous sealing boundary, no region of which is slidingly displaceable relative to any adjacent region thereof; said sleeve-displacing means of the control means includes a drive member substantially fixedly associated with the axial end region of said sleeve remote from said activating means, said drive member defining a region of said sealing boundary; and said axial end region of the sleeve is enclosed by at least one metal bellows portion located between said drive member and a further adjacent region of said sealing boundary, said at least one metal bellows portion being of generally circular cylindrical configuration in an undeformed disposition thereof, and axial end regions of said at least one metal bellows portion being substantially fixedly sealingly connected with adjacent regions of said sealing boundary.

3. A manipulator according to claim 2, wherein said at least one metal bellows portion is located to one axial side of said drive member of the sleeve-displacing means, and a further metal bellows portion is located to the other axial side of said drive member.

4. A manipulator for handling objects within a sealed chamber, comprising:
   (a) a first or active manipulator portion locatable within a said sealed chamber,
   (b) a second or mounting manipulator portion mountable on a wall portion defining a boundary region of a said sealed chamber so that said active manipulator portion is located inwardly of said boundary region and within said chamber, and
   (c) a third or operating manipulator portion located externally of said boundary region when the manipulator is mounted on a said wall portion, said active manipulator portion having object-holding means disposable in a plurality of operating configurations, said operating manipulator portion having control means for displacing said object-holding means between one of said operating configurations and another of said configurations and having an internal region which is in communication with the environment within a sealed chamber when the manipulator is mounted on a said wall portion, said object-holding means of said active manipulator portion being continuousl rotatable through at least 360° about an axis of the manipulator extending between said object-holding means and said control means of the operating manipulator portion and being mounted at one axial end region of a shaft extending within said manipulator in the direction of said axis of the manipulator, said shaft being mounted for rotation about said axis, a sleeve extending substantially coaxially of said shaft within said manipulator in the direction of said axis of the manipulator, said sleeve being axially displaceable relative to said shaft and being associated with said object-holding means for displacement of said means between operating configurations thereof, said control means of the manipulator including drive means for rotatinq said shaft about said axis and means for axially displacing said sleeve relative to said shaft, said object-holding means having a pair of opposed jaws, each of said jaws being pivotably mounted and having an object-engaging face which is urged towards the corresponding face of the opposed jaw in a gripping configuration of the object-holding means, said sleeve being associated with said jaws of the object-holding means by activating means mounted on said shaft for rotation therewith, said activating means being displaceable relative to said shaft in the direction of said axis of the manipulator to displace said jaws between said gripping and a release configuration of the object-holding means, said sleeve being non-rotatably with mounted within said manipulator, said activating means being associated said sleeve through bearing means for transmitting axial displacement of said sleeve to said activating means while also permitting rotation of said shaft and activating means relative to said sleeve and about said axis of the manipulator, and said internal region of said operating manipulator portion being sealed against the environment external of a said sealed chamber and the manipulator.

5. A manipulator according to claim 4, wherein said internal region of said operating manipulator portion is sealed against said external environment by a substantially continuous sealing boundary, no region of which is slidingly displaceable relative to any adjacent region thereof; said sleeve-displacing means of the control means includes a drive member substantially fixedly associated with the axial end region of said sleeve remote from said activating means said drive member defining a region of said sealing boundary; and said axial end region of the sleeve is enclosed by at least one metal bellows portion located between said drive member and a further adjacent region of said sealing boundary, said at least one metal bellows portion being of generally circular cylindrical configuration in an undeformed disposition thereof, and axial end regions of said at least one metal bellows portion being substantially fixedly sealingly connected with adjacent regions of said sealing boundary.

6. A manipulator according to claim 5, wherein said at least one metal bellows portion is located to one axial side of said drive member of the sleeve-displacing means, and a further metal bellows portion is located to the other axial side of said drive member.

* * * * *